United States Patent
Mathews et al.

(10) Patent No.: US 12,192,164 B2
(45) Date of Patent: Jan. 7, 2025

(54) PROCESSING MEDIUM ACCESS CONTROL (MAC) ADDRESS IN CUSTOMER-PREMISES EQUIPMENT (CPE)

(71) Applicant: Cujo LLC, Walnut, CA (US)

(72) Inventors: James Mathews, Utrecht (NL); Matti Niemenmaa, Helsinki (FI)

(73) Assignee: Cujo LLC, Walnut, CA (US)

( * ) Notice: Subject to any disclaimer, the term of this patent is extended or adjusted under 35 U.S.C. 154(b) by 0 days.

(21) Appl. No.: 18/316,378

(22) Filed: May 12, 2023

(65) Prior Publication Data

US 2024/0380724 A1    Nov. 14, 2024

(51) Int. Cl.
  *G06F 15/16*    (2006.01)
  *H04L 9/40*    (2022.01)
  *H04L 61/255*    (2022.01)
  *H04L 101/622*    (2022.01)

(52) U.S. Cl.
  CPC ........ *H04L 61/255* (2013.01); *H04L 63/0876* (2013.01); *H04L 2101/622* (2022.05)

(58) Field of Classification Search
  CPC .............. H04L 61/255; H04L 63/0876; H04L 2101/622
  USPC ................................ 709/223, 224, 245, 225
  See application file for complete search history.

(56) References Cited

U.S. PATENT DOCUMENTS

| | | | | |
|---|---|---|---|---|
| 11,528,252 | B2* | 12/2022 | Sekar | H04L 61/5092 |
| 2012/0201537 | A1* | 8/2012 | Uekama | H04L 25/26 |
| | | | | 398/51 |
| 2013/0298221 | A1* | 11/2013 | Smith | H04L 63/0414 |
| | | | | 726/13 |
| 2016/0094488 | A1* | 3/2016 | Chen | H04L 49/25 |
| | | | | 370/401 |

FOREIGN PATENT DOCUMENTS

CN    1561045 A  *  1/2005

OTHER PUBLICATIONS

Extended European Search Report for EP Patent Application No. 23173126.6, dated Oct. 24, 2023, 7 pages.

* cited by examiner

*Primary Examiner* — Liang Che A Wang
(74) *Attorney, Agent, or Firm* — Dority & Manning, P.A.

(57) ABSTRACT

After a data packet containing an active medium access control (MAC) address of a connected device enters a customer-premises equipment (CPE), the active MAC address of the connected device is replaced with an earlier MAC address of the connected device. Before the data packet with the earlier MAC address exits the CPE, the earlier MAC address of the connected device is replaced with the active MAC address of the connected device.

20 Claims, 8 Drawing Sheets

PROCESSING MEDIUM ACCESS CONTROL (MAC) ADDRESS IN CUSTOMER-PREMISES EQUIPMENT (CPE)

BACKGROUND

Service delivery for consumers and businesses is impacted by an obfuscation of a connected device operating in a local area network (LAN) implemented by a customer-premises equipment (CPE) of a network service provider (NSP). The CPE-based services are dependent on a Medium/Media Access Control (MAC) address acting as a standardized device identifier. The obfuscation of the connected device is a result of privacy enhancing techniques used by operating systems (OS) of connected devices such as iOS®, Android®, or Windows®. In the so-called MAC address randomization technique, the original vendor-embedded MAC address is changed to a random value. The implementation and use of the MAC address randomization varies and causes problems as the services running on the CPE are no longer able to rely on the MAC address as a single source of truth in their service delivery.

SUMMARY

According to an aspect of the disclosure, there is provided subject matter of independent claims.

One or more examples of implementations are set forth in more detail in the accompanying drawings and the detailed description.

BRIEF DESCRIPTION OF DRAWINGS

Some examples will now be described with reference to the accompanying drawings, in which.

DETAILED DESCRIPTION

The following description discloses examples. Although the specification may refer to "an" example in several locations, this does not necessarily mean that each such reference is to the same example(s), or that the feature only applies to a single example. Single features of different examples may also be combined to provide other examples. Words "comprising" and "including" should be understood as not limiting the described examples to consist of only those features that have been mentioned as such examples may contain also features and structures that have not been specifically mentioned. The examples and features, if any, disclosed in the following description that do not fall under the scope of the independent claims should be interpreted as examples useful for understanding various examples and implementations of the invention.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together.

Device identification, which may be defined as a capability to detect and identify a connected device in a home/office local area network (LAN), increases cybersecurity. Traditionally, the Medium/Media Access Control (MAC) address is assigned by a device manufacturer and used in the data communication (such as with wireless radio signals) within the LAN for the device identification. However, the MAC randomization, which anonymizes and randomizes the MAC address to increase privacy, hinders the device identification based on the MAC address. In the MAC randomization, instead of using the vendor-embedded MAC address, or a randomized MAC address used for an initial registration to services in the customer-premises equipment (CPE), the connected device transmits an active MAC address, which may be a randomized MAC address that is different from the earlier MAC address used for an initial registration to the services in the CPE. The problems caused by the MAC randomization are solved by replacing the active MAC address with the earlier MAC address for the transfer path within the CPE of the data packets transferred from or to the connected device. With this solution, the services in the CPE recognize the connected device based on the earlier MAC address set in the data packets.

Figure 1A:
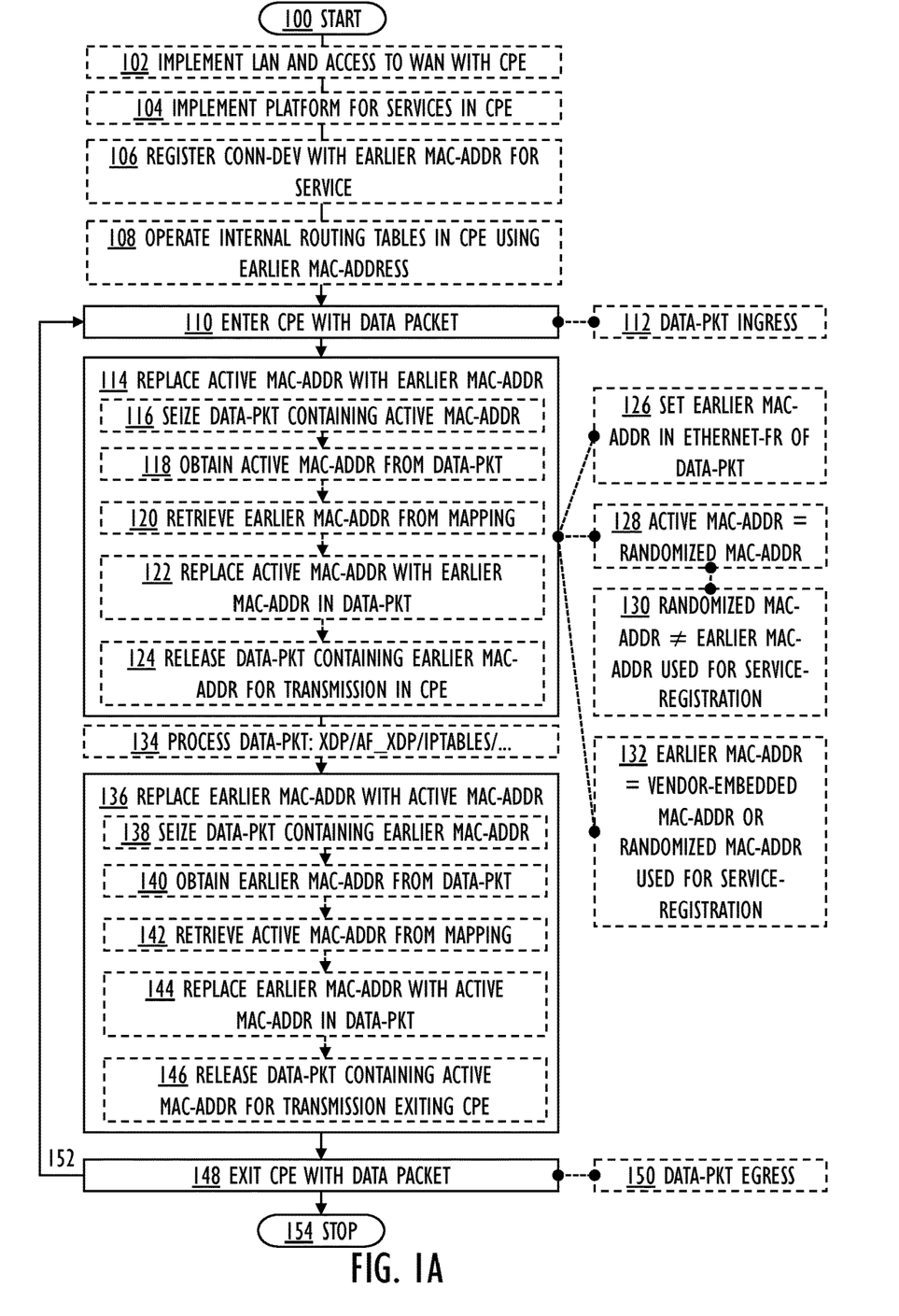
FIG. 1A, FIG. 1B, and FIG. 1C are flowcharts illustrating examples of a method.
Figure 1B:
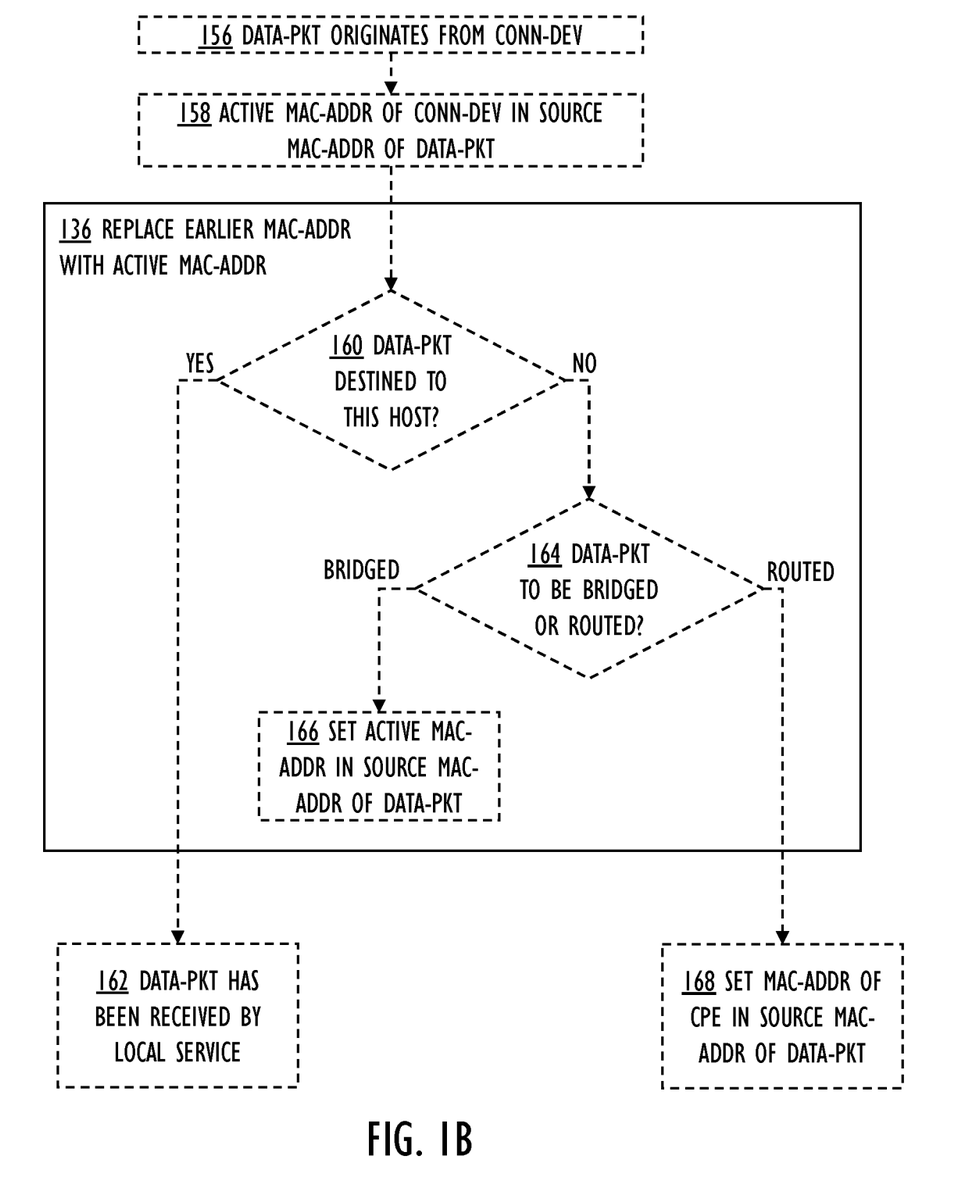
Figure 1C:
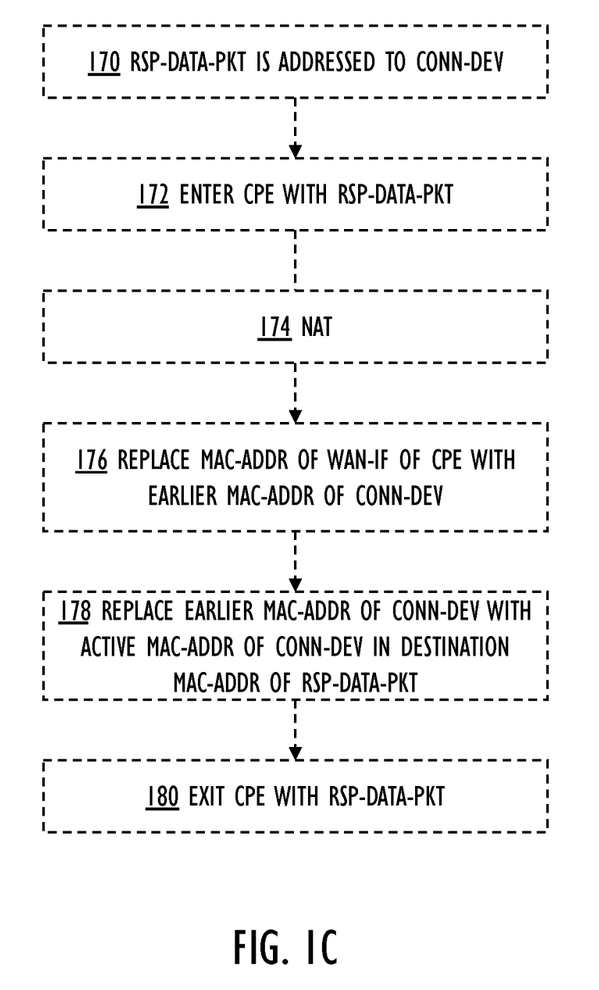

FIG. 1A, FIG. 1B, and FIG. 1C illustrate a method. The method performs operations related to the MAC address processing.

The method starts in 100 and ends in 154. The method may run in principle endlessly. The infinite running may be achieved by looping 152 back after an operation 148 to an operation 110 as shown in FIG. 1A.

The operations are not strictly in chronological order in FIG. 1A, FIG. 1B, and FIG. 1C, i.e., no special order of operations is required, except where necessary due to the logical requirements for the processing order. In such a case, the synchronization between operations may either be explicitly indicated, or it may be understood implicitly by the skilled person. If no specific synchronization is required, some of the operations may be performed simultaneously or in an order differing from the illustrated order. Other operations may also be executed between the described operations or within the described operations, and other data besides the illustrated data may be exchanged between the operations.

Figure 2:
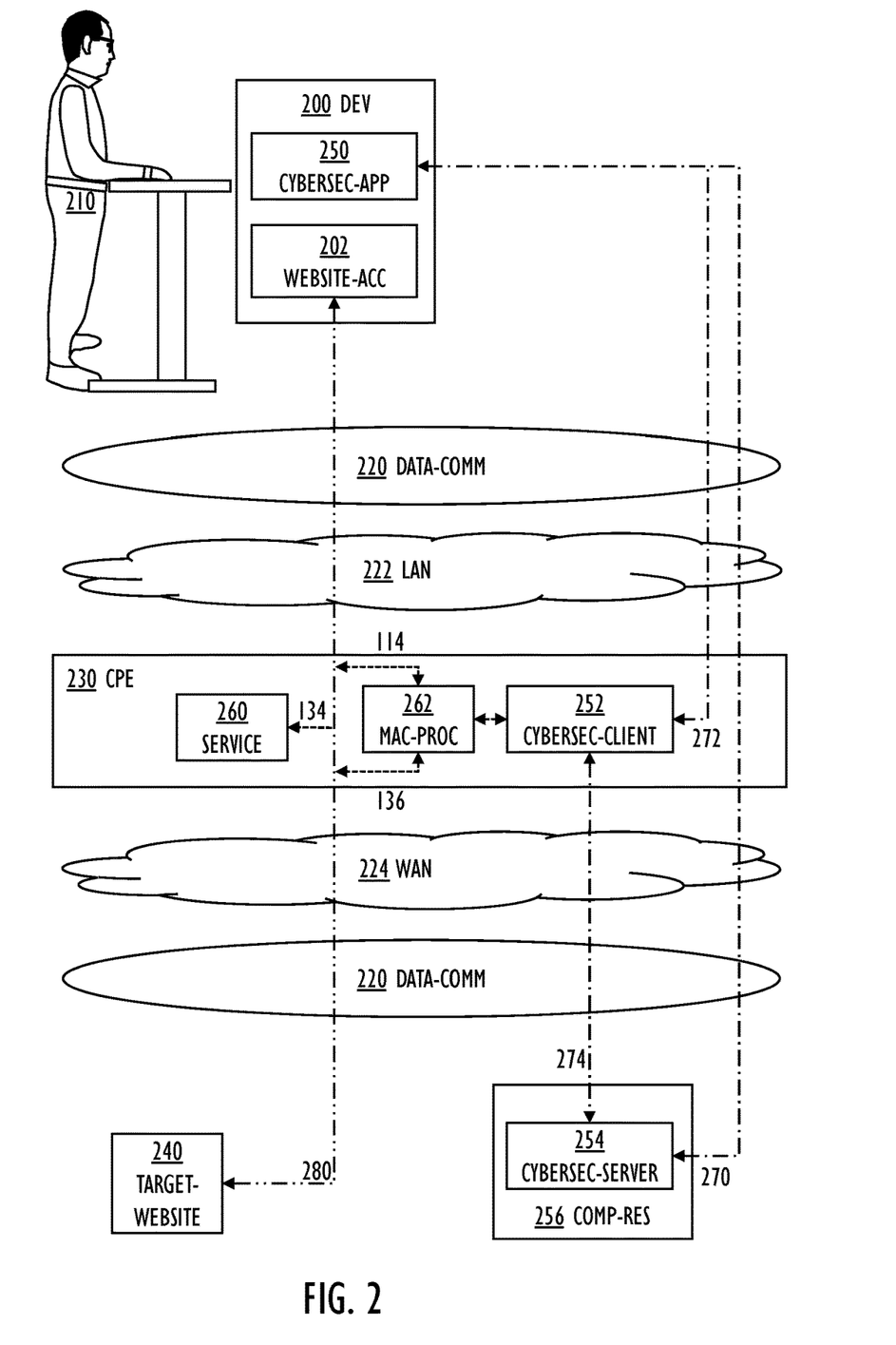
FIG. 2 is a block diagram illustrating an example implementation environment for the method.

FIG. 2 illustrates an example implementation environment for the method. The method may be a computer-implemented method. The method operates within a CPE 230. The described processing of MAC addresses is performed by a MAC processing entity 262.

First, a data packet containing an active MAC address of a connected device 200 enters 110 the CPE 230. This may be called an ingress 112 of the data packet.

After the data packet containing the active MAC address of the connected device 200 enters 110 the CPE 230, the active MAC address of the connected device 200 is replaced 114 with an earlier MAC address of the connected device 200.

The CPE 230 is configured to implement 102 a LAN 222 for a data communication 220 of the connected device 200, and an access for the data communication 220 to a wide area network (WAN) 224 such as the Internet. In the data communication 220, the data packets may be transferred from and to the connected device 110.

The CPE 230 is configured to implement 104 a platform for services 260. At least one service 260 is configured to register 106 the connected device 200 with the earlier MAC address.

The active MAC address of the connected device 200 may be 128 a randomized MAC address of the connected device 200. The randomized MAC address of the connected device 200 is different 130 from the earlier MAC address of the connected device 200 used for an initial registration to at least one service 260 in the CPE 230. The connected device 200 may perform the initial registration to the at least one service while the connected device 200 connects to the LAN 222 of the CPE 230 for the first time. The earlier MAC address of the connected device 200 may be 6 a vendor-embedded MAC address, or a randomized MAC address used for an initial registration to at least one service 260 in the CPE 230. The vendor-embedded MAC address may be an organizationally unique identifier (OUI). The OUI may be a 24-bit number used to identify the connected device 200 as manufactured by a specific vendor.

The data packet containing the earlier MAC address of the connected device 200 is then processed 134 as needed by various services 260 in the CPE 230. The internal routing tables of the CPE 230 may be configured to operate 108 using the earlier MAC address of the connected device 200. The services 260 may use eXpress Data Path (XDP), AF-XDP (a new address family in the Linux kernel from version 4.18 onwards), or iptables (a user space utility program for configuring the IP packet filter rules) for the data packet processing. The iptables acts as an interface, which uses Netfilter to process the data packets. The Netfilter is a framework provided by the Linux® kernel enabling networking operations (packet filtering, network address translation, and port translation) to be implemented in the form of customized handlers. The data packet may travel in the CPE 230 using a communication mechanism including, but not being limited to, a packet-routing mechanism, inter-process communication techniques, message-based communication interfaces, internal databus techniques, inter-processor communication techniques, inter-processor databus techniques, etc. In an example, the services 260 on the CPE 230 may be implemented as Common Component Software Platform (CCSP) components on a CCSP layer. The CCSP layer was originally developed by Cisco®. Consequently, the communication mechanism may be implemented as the CCSP message bus (using a D-Bus or an R-Bus for the inter-process communication, IPC, for example).

Before the data packet with the earlier MAC address exits 148 the CPE 230, the earlier MAC address of the connected device 200 is replaced 136 with the active MAC address of the connected device 200.

Finally, the data packet containing the earlier MAC address exits 148 the CPE 230. This may be called an egress 150 of the data packet.

The described two operations 114 and 136 implement an architecture, which enables local and/or third party cloud-based services 260 to rely on the earlier MAC as the single source of truth in the CPE 230 of a network service provider (NSP).

CPE-embedded operating system services typically rely on both MAC and IP addresses. The obfuscation of the MAC address does not cause any direct functional limitation on the operating system itself to perform its designed service. The connected device with a randomized MAC address still receives an IP address and the CPE 230 is still able to process the packets belonging to the connected device, which has received the IP address. The real problem caused by the obfuscation is the ability to rely on a constant identity to consistently apply the same service using the same policy to the same connected device 200, which is recognized by the earlier MAC address (which may be a manufacturer-embedded MAC address, or a randomized MAC address) used to register to at least one service 260.

Let us take an example, a connected device 200, whose original embedded manufacturer MAC address is aa:bb:cc:dd:ee:ff. For a dynamic host configuration protocol (DHCP) lease reservation, the owner or the NSP has defined a policy/rule on the CPE 230 that this MAC address ("earlier MAC address"), which belongs to this specific connected device 200, should always get the IP address 192.168.1.72. With this reserved IP address, the owner or the NSP applies specific policies/rules based on the IP address for services like port forwarding, firewall, content filter, etc. Every time the connected device 200 reconnects with the LAN 222 of the CPE 230, the connected device 200 is ensured to receive the same IP address. The DHCP lease reservation record on the LAN 222 of the CPE 230 is 192.168.1.72=aa:bb:cc:dd:ee:ff. The OS privacy function of the connected device 200 may randomize the MAC address to a new unique address: 00:00:aa:00:00:aa. This causes that the next time the connected device 200 re-connects to the LAN 222 of the CPE 230, the connected device 200 will receive an IP address from the DHCP pool, 192.168.1.34, for example. The previously applied policies/rules like DHCP lease reservation, port forwarding, firewall, or content filter cannot any longer be applied to the connected device 200 as it has received a different IP address ("active MAC address"). All CPE 230 network policies and services relying on the MAC address, or the combination of the MAC address and the IP address for the connected device 200 are impacted by the randomization of the MAC address. The operations 114 and 136 provide an architecture, which enables the CPE 230 OS and its local or third party services to be aware of the earlier (original/initial) MAC address.

As used herein, the term "connected device" 200 refers to a physical device with communication capabilities configured to communicate via the LAN 222 of the CPE 230 with the WAN 224. The connected device 200 includes, but is not limited to, a user device, an Internet of Things (IoT) device, or another ubiquitous computing device.

As shown in FIG. 2, the connected device 200 is configured to execute a website access application 202, such as web user interface application (a web browser, for example), or a stand-alone application (a mobile app, for example), and as a result, the data communication 220 including network traffic 280 between the connected device 200 and an accessed website 240 is caused. The website access application 202 may automatically cause the data communication 220, or, alternatively, the data communication 220 may be generated as a result of an action by a user 210 through user interface controls of the website access application 202.

The data communication 220 may be intercepted by a cybersecurity apparatus 500 (described later with reference to FIG. 5A, and FIG. 5B). The intercepted data communication 220 may be analyzed in order to perform a device identification procedure, by a cybersecurity client 252, possibly augmented by a cybersecurity server 254, or by a device intelligence client supported by a processing cloud (not illustrated in FIG. 2). Machine learning algorithms may use a number of other data items (such as device-specific unique radio interface characteristics, and other active and historic unique identifiers related to the connected apparatus and its communication) to enable the device identification despite of the MAC randomization. Basically, the objective is to detect that the same connected device 200 may use an active MAC address, and one or more earlier MAC addresses. This is described in various applications and patents by the applicant, incorporated herein by reference in all jurisdictions where applicable, such as in US 2022/0021670 A1, US 2022/0322089 A1, and U.S. Pat. No. 11,528,189 B1.

In the above-described way, the initial device identification may be performed. The analysis of the intercepted data communication 220 may include collecting device traffic metadata and filtering relevant identification data points from network flow sent and received by the connected device 200 in the LAN 222 of the CPE 230. In addition to the analysis of raw data, or as an alternative, refined data (such as metadata) such as datasets, markers, connection requests, etc. may be analyzed. A suitable network flow monitoring technology, such as Cisco® NetFlow or alternative network flow monitoring technologies (which may be implemented as a service of the OS of the CPE 230) may be used to intercept the data communication 220. NetFlow, or its equivalents collect IP network traffic as it enters or exits an interface (in the CPE 230, for example), and based on the collected traffic, a source and a destination of the network traffic (in the form of IP addresses) within the data communication 220 may be determined. The CPE 230 (or more specifically the cybersecurity client 252 running on the CPE 230) sends the data points extracted from the data communication 220 (by the NetFlow, for example) to the cybersecurity server 254. The cybersecurity server 254 feeds the data points to an analysis engine, which analyses the extracted data points and provides a model matching device identifier for the connected device 200 based on the data points. The analysis engine is able to detect that the connected device 200, even if it uses an obfuscated active MAC address, is in fact the connected device 200 that originally used an earlier MAC address. The active MAC address and the one or more earlier MAC addresses may be mapped to each other and stored in a database (or another data storage) of the cybersecurity server 254, and such mapped data may be passed back to a database (or other data storage, or even a cache) of the cybersecurity client 252.

As the CPE 230 implements the LAN 222 for the data communication 220 of the connected device 200, the CPE 230 may intercept the data communication 220.

As used herein, the term "intercepting" refers to user-approved lawful interception or monitoring of the data communication 220, with a purpose and goal of increasing cybersecurity related to the connected device 200 and its operating environment. As the data communication 220 is intercepted, the data communication 220 is accessed and collected between the transmitting device and the receiving device. The data communication 220 may be intercepted even if the digital data transmission units (such as messages) in the data communication 220 are addressed to the receiving device. The intercepting may be implemented so that the data communication 220 is passively monitored, i.e., the data communication 220 is not affected by the intercepting. Alternatively, if needed, the intercepting may include a seizing of the data communication 220, i.e., the data communication 220 is actively influenced so that a connection and/or requests and/or responses are blocked until it may be decided whether a cybersecurity action is required.

As used herein, the term "data communication" 220 refers to the transmission and/or reception of (digital) data by the connected device 200. The data communication 220 is transferred using digital data transmission units over a communication medium such as one or more communication channels (implemented by copper wires, optical fibers, and wireless communication using radio spectrum, for example) between the connected device 200 and another network node such as the target website 240. The data are a collection of discrete values that convey information, or sequences of symbols that may be interpreted, expressed as a digital bitstream or a digitized analog signal, including, but not being limited to: text, numbers, image, audio, video, and multimedia. The data may be represented as an electromagnetic signal (such as an electrical voltage or a radio wave, for example). The digital transmission units may be transmitted individually, or in a series over a period of time, or in parallel over two or more communication channels, and include, but are not limited to: messages, protocol units, packets, and frames. One or more communication protocols may define a set of rules followed by the connected device 200 and other network nodes to implement the successful and reliable data communication 220. The communication protocols may implement a protocol stack with different conceptual protocol layers. In a connection-oriented data communication 220, a connection needs to be established for transferring the payload data. In a connectionless data communication 220, the payload data is transferred over different paths with an independent routing.

In an example, replacing 114 the active MAC address of the connected device 200 with the earlier MAC address of the connected device 200 may be implemented by intercepting the data packet. First, the data packet containing the active MAC address is seized 116. The active MAC address is obtained 118 from the data packet. The earlier MAC address of the connected device 200 is retrieved 120 from a mapping between the active MAC address and the earlier MAC address. The mapping between the active MAC address and the earlier MAC address may be stored in a database, cache, or other applicable data structure storage. The active MAC address is replaced 122 with the earlier MAC address in the data packet. And finally, the data packet containing the earlier MAC address is released 124 for a transmission in the CPE 230.

Accordingly, replacing 136 the earlier MAC address of the connected device 200 with the active MAC address of the connected device 200 may also be implemented by intercepting the data packet. First, the data packet containing the earlier MAC address is seized 138. The earlier MAC address is obtained 140 from the data packet. The active MAC address of the connected device 200 is retrieved 142 from a mapping between the active MAC address and the earlier MAC address. The earlier MAC address is replaced 144 with the active MAC address in the data packet. And finally, the data packet containing the active MAC address is released 146 for a transmission exiting the CPE 230.

Figure 3:
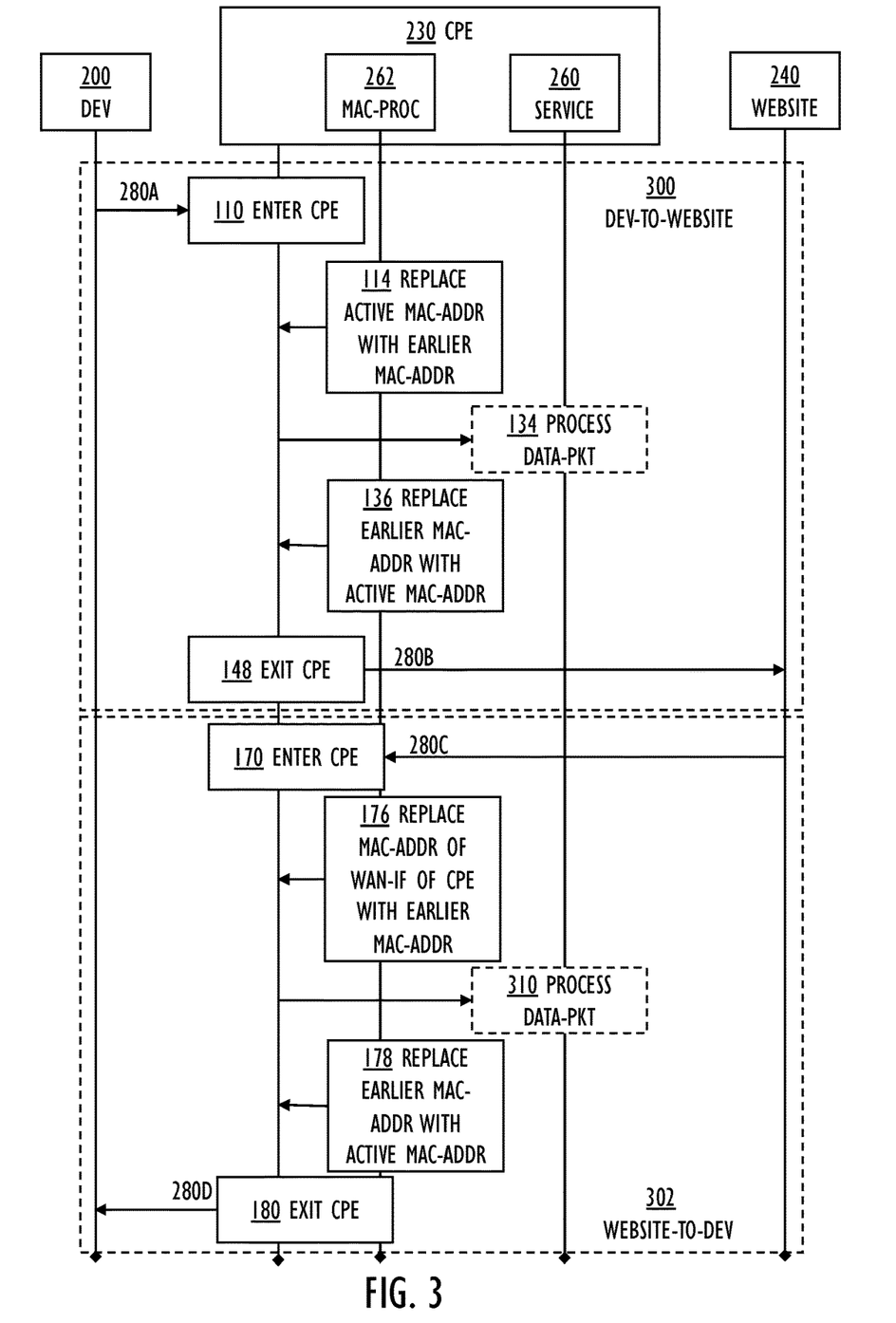
FIG. 3 is a sequence chart illustrating communication between various actors of the method.

FIG. 3 illustrates communication between various actors of the method. Note that the communication is two-way: the upper half 300 describes the communication from the connected device 200 to the accessed website 240, and the lower half 302 describes the communication from the accessed website 240 to the connected device 200.

The connected device 200 may create a connection 280 using a packet protocol for the website access application 202 of the connected device 200 to the target website 240. The target website 240 may host a server application enabling access by the website access application 202. The packet protocols include, but are not limited to, Transmission Control Protocol/Internet Protocol (TCP/IP), User Datagram Protocol/Internet Protocol (UDP/IP), and QUIC, which establishes a multiplexed transport on top of the UDP. Various Hypertext Transfer Protocol/Hypertext Transfer Protocol Secure (HTTP/HTTPS) requests may then be transferred in the connection 280 (using TCP streams or UDP datagrams, for example). In the Internet protocol suite, the connection 280 is operated in a link layer, an internet layer, and a transport layer, and the requests transmitted in the connection 280 are operated in an application layer.

As shown in the upper half 300 of the FIG. 3, the connected device 200 is connected to the LAN 222 of the CPE 230, and the data packet is transmitted in the LAN connection 280A to the CPE 230. The data packet containing the active MAC address of the connected device enters 110 the CPE 230. The active MAC address of the connected device 200 is replaced 114 with an earlier MAC address of the connected device 200. The data packet containing the earlier MAC address of the connected device is then processed 134 as needed by various services 260 in the CPE 230. The earlier MAC address of the connected device 200 is replaced 136 with the active MAC address of the connected device 200. Finally, the data packet containing the earlier MAC address exits 148 the CPE 230. The data packet is transmitted in the WAN connection 280B to the accessed website 240. Note that the processing in the operation 114 may be performed immediately after the data packet enters 110 the CPE 230, or after initial basic protocol processing of the data packet. Also, the processing in the operation 136 may be performed immediately before the data packet exits 148 the CPE 230, or before final basic protocol processing of the data packet, The processing required for the upper half 300 of FIG. 3 is illustrated in FIG. 1B. The data packet originates 156 from the connected device 200, and the active MAC address of the connected device 200 is 158 in a source MAC address of the data packet. Replacing 136 the earlier MAC address of the connected device 200 with the active MAC address of the connected device 200 may be implemented so that in response to bridging 164-BRIGDED the data packet, the active MAC address of the connected device is set 166 in the source MAC address of the data packet, or in response to routing 164-ROUTED the data packet, a MAC address of a router of the CPE 230 is set 168 in the source MAC address of the data packet. In an example, the MAC address of the CPE 230 comprises a MAC address of a WAN interface of the CPE 230, such as a MAC address of the network interface 806 of the CPE 230.

FIG. 1B also illustrates an example, wherein the data packet is destined 160-YES to this host 230, and the processing ends because the data packet has been received 162 by the local service 260 in the earlier operation 134, i.e., the data packet does not exit the CPE 230.

And as shown in the lower half 302 of the FIG. 3, the CPE 230 is connected to the WAN 224, and a response data packet is received from the WAN connection 280C to the CPE 230 in response to the data packet. The response data packet contains the MAC address of the WAN interface of the CPE 230 enters 172 the CPE 230. The MAC address of the WAN interface of the CPE 230 is replaced 176 with the earlier MAC address of the connected device 200. The response data packet containing the earlier MAC address of the connected device is then processed 310 as needed by various services 260 in the CPE 230. The earlier MAC address of the connected device 200 is replaced 178 with the active MAC address of the connected device 200. Finally, the response data packet containing the earlier MAC address exits 180 the CPE 230 to the LAN 222. The data packet is transmitted in the LAN connection 280D to the connected device 200. Note that the processing in the operation 176 may be performed immediately after the response data packet enters 172 the CPE 230, or after initial basic protocol processing of the response data packet. Also, the processing in the operation 178 may be performed immediately before the response data packet exits 180 the CPE 230, or before final basic protocol processing of the response data packet, The processing required for the lower half 302 of FIG. 3 is illustrated in FIG. 1C. The response data packet is addressed 170 to the connected device 200 (i.e., the data packet originates from the accessed website 240) in response to the data packet, and the MAC address of the WAN interface of the CPE 230 is in a destination MAC address of the response data packet.

FIG. 1C also illustrates an example, wherein a network address translation (NAT) 174 is required. The CPE 230 may have a private IP address for communicating with the connected devices 200 in the LAN 222, and a public IP address communicating with other devices in the WAN 224. Also, the connected device 200 has a private IP address in the private address space of the LAN 222. As each data packet passes from the LAN 222 to the WAN 224, the CPE 230 translates a source IP address in each data packet from the private IP address to the public IP address. The CPE 230 tracks each active connection transferring the data packets (particularly the destination address and port). When the CPE 230 receives the response data packet from the WAN 224, the CPE 230 uses the connection tracking data to forward the response data packets to the private IP address of the connected device 200.

Figure 4:
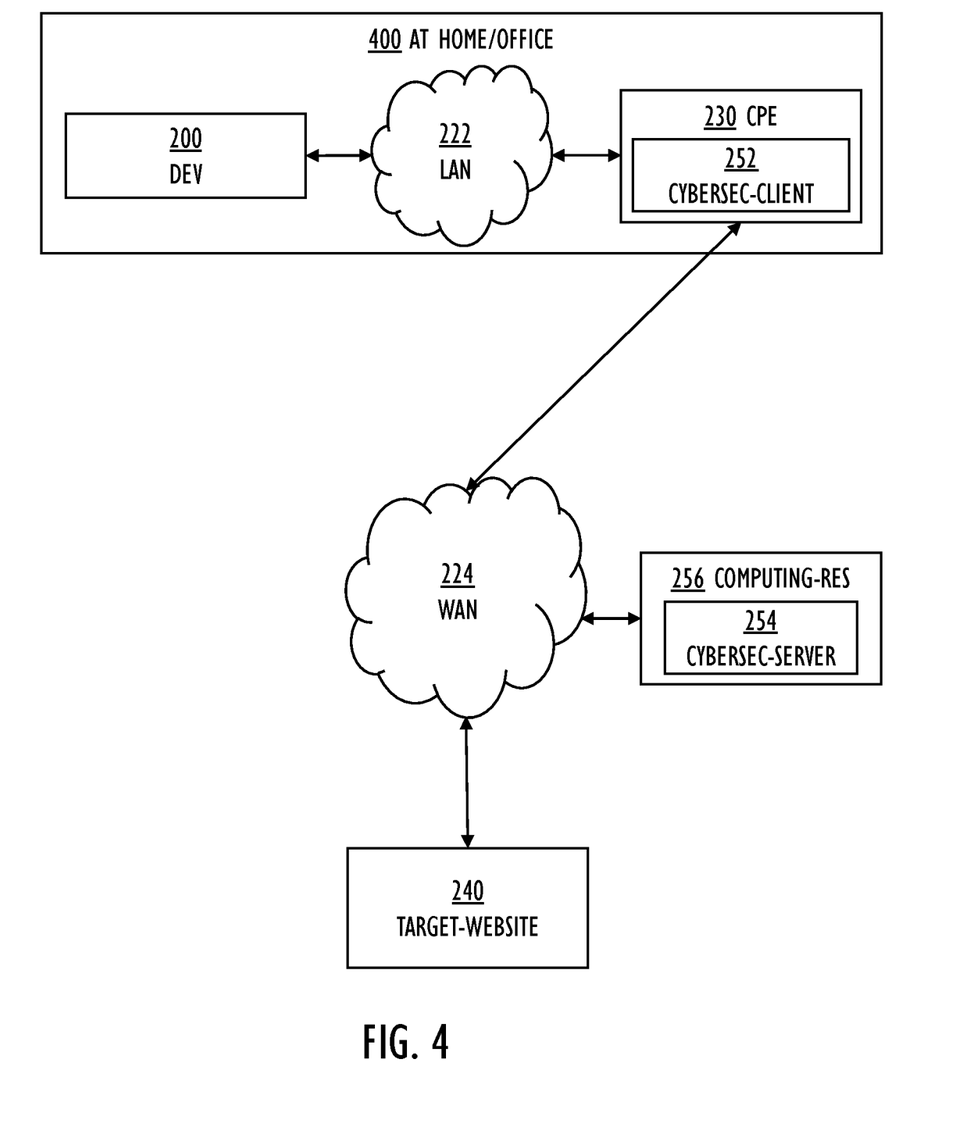
FIG. 4 is a block diagram illustrating an example operation environment.

FIG. 4 illustrates an example operation environment at home or office 400.

The WAN such as the Internet 224 uses the Internet protocol suite including TCP/IP and UDP/IP to globally connect computer networks so that communication is enabled between connected devices 200 and various Internet services provided typically by websites 240. The Internet 224 comprises public networks, private networks, academic networks, business networks, government networks, etc. interlinked with various networking technologies. The various services provide access to vast World Wide Web (WWW) resources, wherein webpages may be written with Hypertext Markup Language (HTML) or Extensible Markup Language (XML) and accessed by a browser 202 or another application (such as a mobile app) running in the connected device 200.

From the cybersecurity point of view, the Internet services may be divided between legitimate services and fraud services. Legitimate services operate according to moral and ethical standards enforced by law, police, or social pressure. Fraud services do not follow moral and ethical standards, and often perform criminal acts to disclose, steal or damage electronic data, software, or hardware, or disrupt or misdirect services provided by the electronic data, software, and hardware. Fraud services may be fraudulent to the core, i.e., their only reason for existence is to perform malicious acts, but they may also be legitimate services as such, but being infected with malicious software so as to enable criminal acts. The criminal acts in general include, but are not limited to using a backdoor to bypass security mechanisms, make a denial-of-service attack (DoS), also as a distributed denial-of-service (DDoS), installing software worms or keylogger, eavesdropping a communication, phishing, spoofing, tampering, installing malware, etc. Note that different service providers, such as network service providers, cloud service operators, and cybersecurity operators, just to name a few, may operate and/or manage the various network nodes shown in the FIG. 2.

The CPE 230 is located at home or office 400 of a user 210 of the connected device 200. The CPE 230 is stationary equipment connected to a telecommunication circuit of a carrier (such as an NSP offering internet access using broadband or fixed wireless technologies) at a demarcation point. The demarcation point may be defined as a point at which the public Internet 224 ends and connects with the LAN 222 at the home or office. In this way, the CPE 230 acts as a network bridge, and/or a router.

The CPE 230 may include one or more functionalities of a router, a network switch, a residential gateway (RGW), a fixed mobile convergence product, a home networking adapter, an Internet access gateway, or another access product distributing the communication services locally in a residence or in an enterprise via a (typically wireless) LAN 222 and thus enabling the user 210 of the connected device 200 to access communication services of the NSP, and the Internet 224. Note that the CPE 230 may also be implemented with wireless technology, such as a 4G or 5G CPE 230 configured to exchange a 5G cellular radio network signal with the WAN 224 of a base station operated by the broadband service provider, and generate a Wi-Fi® (or WLAN) or wired signal to implement the LAN 222 to provide access for the connected device 200. Furthermore, the 4G/5G CPE 230 performs the conversion between the 4G/5G cellular radio network signal and the Wi-Fi® or wired signal.

Figure 5A:
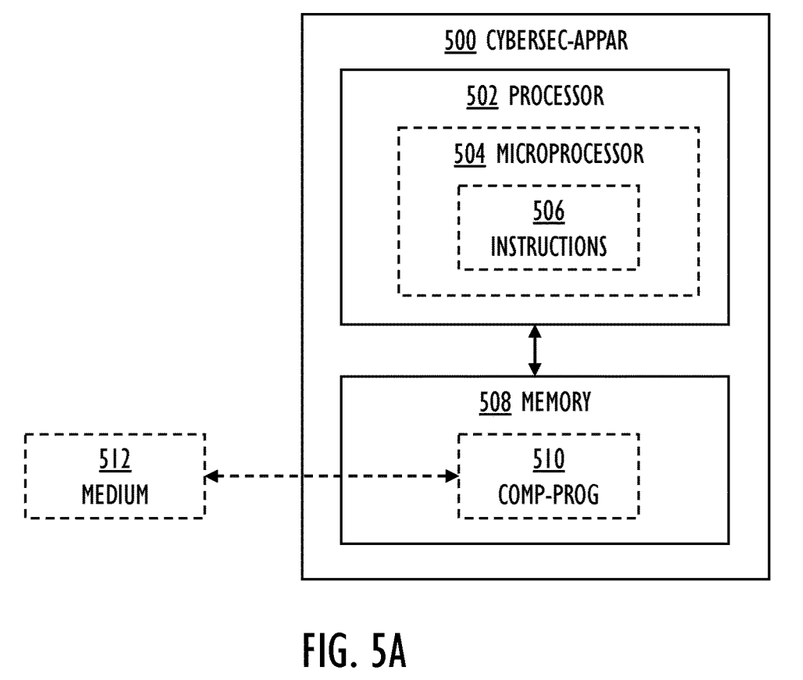
FIG. 5A and FIG. 5B are block diagrams illustrating examples of a cybersecurity apparatus.
Figure 5B:
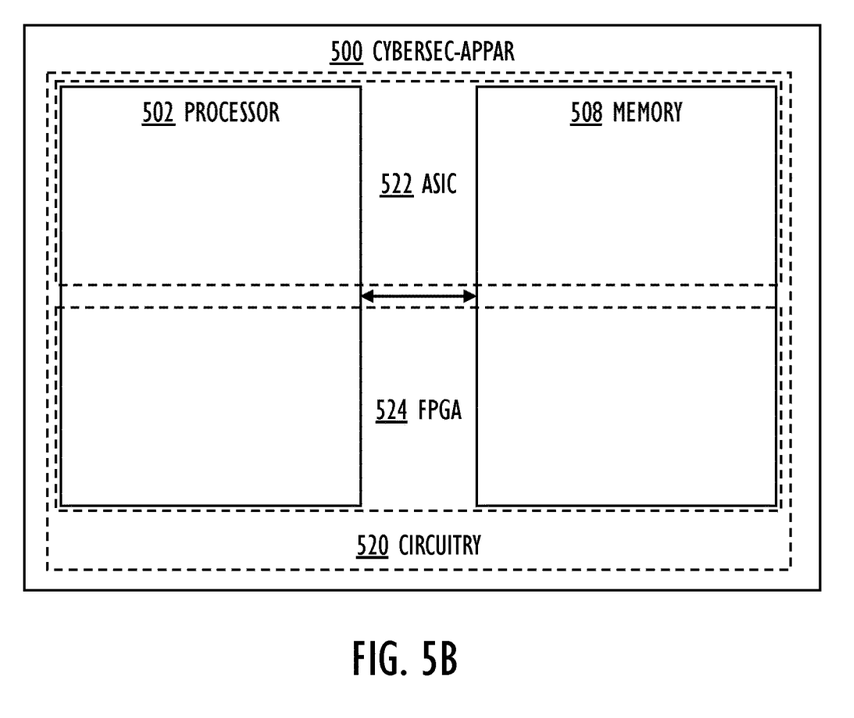

FIG. 5A and FIG. 5B illustrate examples of a cybersecurity apparatus 500. The method described with reference to FIG. 1A, FIG. 1B, and FIG. 1C may be implemented at least partly by the cybersecurity apparatus 500, i.e., the MAC processing entity 262 of FIG. 2 may be implemented by the cybersecurity apparatus 500. The apparatus 500 may execute the operations defined in the method. The apparatus 500 may implement an algorithm, which includes at least the operations of the method, but may optionally include other operations related to the cybersecurity in general. Note that the method described with reference to FIG. 1A, FIG. 1B, and FIG. 1C may be implemented as a part of the cybersecurity client 252 running in the CPE 230 as shown in FIG. 2, or as a functionality embedded in the CPE 230. As shown in FIG. 2, the cybersecurity apparatus 500 may comprise various distributed actors communicatively coupled 270, 272, 274 with each other.

In an example, the CPE 230 uses a specific operating system, and a data structure representing the data packet in a kernel (such as a Linux® kernel) of the operating system may be modified to hold both the active MAC address and the earlier MAC address separately. Additionally, the kernel may also assign the required MAC address on the data packet ingress 112 and the data packet egress 150, but the cybersecurity apparatus 500 may also be in charge of this operation, and the kernel only provides the changed data structure. The cybersecurity apparatus 500 may even provide storage for the mapping between the active MAC address and the earlier MAC address.

The apparatus 500 comprises one or more memories 508, and one or more processors 502 coupled to the one or more memories 508 configured to execute the operations described in FIG. 1A, FIG. 1B, and FIG. 1C.

The term "processor" 502 refers to a device that is capable of processing data. The term "memory" 508 refers to a device that is capable of storing data run-time (=working memory) or permanently (=non-volatile memory).

As shown in FIG. 5A, the one or more processors 502 may be implemented as one or more microprocessors 504, which are configured to execute instructions 506 of a computer program 510 stored on the one or memories 508. The microprocessor 504 implements functions of a central processing unit (CPU) on an integrated circuit. The CPU is a logic machine executing the instructions 506 of the computer program 510. The CPU may comprise a set of registers, an arithmetic logic unit (ALU), and a control unit (CU). The control unit is controlled by a sequence of the instructions 506 transferred to the CPU from the (working) memory 508. The control unit may contain a number of microinstructions for basic operations. The implementation of the microinstructions may vary, depending on the CPU design. The one or more microprocessors 504 may be implemented as cores of a single processor and/or as separate processors. Note that the term "microprocessor" is considered as a general term including, but not being limited to a digital signal processor (DSP), a digital signal controller, a graphics processing unit, a system on a chip, a microcontroller, a special-purpose computer chip, and other computing architectures employing at least partly microprocessor technology. The memory 508 comprising the working memory and the non-volatile memory may be implemented by a random-access memory (RAM), dynamic RAM (DRAM), static RAM (SRAM), a flash memory, a solid-state drive (SSD), PROM (programmable read-only memory), a suitable semiconductor, or any other means of implementing an electrical computer memory.

The computer program ("software") 510 may be written ("coded") by a suitable programming language, and the resulting executable code may be stored in the memory 508 and executed by the one or more microprocessors 504.

The computer program 510 implements the method/algorithm. The computer program 510 may be coded using a programming language, which may be a high-level programming language, such as Go, Java, C, or C++, or with a low-level programming language, such as an assembler or a machine language. The computer program 510 may be in source code form, object code form, executable file, or in some intermediate form, but for use in the one or more microprocessors 504 it is in an executable form as an application. There are many ways to structure the computer program 510: the operations may be divided into modules, sub-routines, methods, classes, objects, applets, macros, etc., depending on the software design methodology and the programming language used. In modern programming environments, there are software libraries, i.e., compilations of ready-made functions, which may be utilized by the computer program 510 for performing a wide variety of standard operations. In addition, an operating system (such as a general-purpose operating system) may provide the computer program 510 with system services.

As shown in FIG. 5A, a computer-readable medium 512 may store the computer program 510, which, when executed by the apparatus 500 (the computer program 510 may first be loaded into the one or more microprocessors 504 as the instructions 506 and then executed by one or more microprocessors 504), causes the apparatus 500 (or the one or more microprocessors 504) to carry out the method/algorithm. The computer-readable medium 512 may be implemented as a non-transitory computer-readable storage medium, a computer-readable storage medium, a computer memory, a computer-readable data carrier (such as an electrical carrier signal), a data carrier signal (such as a wired or wireless telecommunications signal), or another software distribution medium capable of carrying the computer program 510 to the one or memories 508 of the apparatus 500. In some jurisdictions, depending on the legislation and the patent practice, the computer-readable medium 512 may not be the wired or wireless telecommunications signal.

As shown in FIG. 5B, the one or more processors 502 and the one or more memories 508 may be implemented by a circuitry 520. A non-exhaustive list of implementation techniques for the circuitry 520 includes, but is not limited to application-specific integrated circuits (ASIC) 522, field-programmable gate arrays (FPGA) 524, application-specific standard products (ASSP), standard integrated circuits, logic components, and other electronics structures employing custom-made or standard electronic circuits.

Note that in modern computing environments a hybrid implementation employing both the microprocessor technology of FIG. 5A and the custom or standard circuitry of FIG. 5B is feasible.

Functionality of the apparatus 500, including the capability to carry out the method/algorithm, may be implemented in a centralized fashion by a stand-alone single physical unit, or alternatively in a distributed fashion using more than one communicatively coupled physical units. The physical unit may be a computer, or another type of a general-purpose off-the-shelf computing device, as opposed to a purpose-build proprietary equipment, whereby research and development costs will be lower as only the special-purpose software (and necessarily not the hardware) needs to be designed, implemented, tested, and produced. However, if highly optimized performance is required, the physical unit may be implemented with proprietary or standard circuitry as described earlier.

Figure 6:
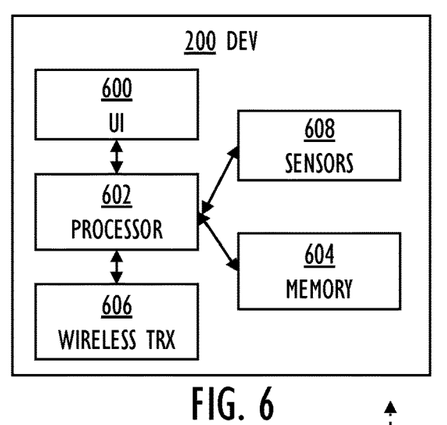
FIG. 6 is a block diagram illustrating an example of a connected device.

FIG. 6 illustrates an example of the connected device 200. The connected device 200 may be a terminal, a user equipment (UE), a radio terminal, a subscriber terminal, a smartphone, a mobile station, a mobile phone, a desktop computer, a portable computer, a laptop computer, a tablet computer, a smartwatch, smartglasses, or some other type of a wired or wireless mobile or stationary communication device operating with or without a subscriber identification module (SIM) or an embedded SIM (eSIM). The user apparatus 200 may be a personal communication device of the user 210. The connected device may also be an Internet of Things (IoT) device 200, which is provided with processing and communication technology and may also include one or more sensors and a user interface, and may be a stand-alone device, or an embedded device in a lighting fixture, thermostat, home security system, camera, smart lock, smart doorbell, smart refrigerator, or another household appliance, heating and cooling system, home and building automation system, vehicle, health and fitness monitor, remote health monitoring system, environmental sensor, IP camera, or network attached storage (NAS), etc.

As shown in FIG. 6, the connected device 200 comprises one or more memories 604, and one or more processors 602 coupled to the one or more memories 604 configured to carry out a part of the method/algorithm. In addition, the connected device 200 comprises a user interface 600 (such as a touch screen or one or more LEDs), and one or more wireless transceivers 606 (such as a WLAN transceiver, a cellular radio network transceiver, and a short-range radio transceiver), and also one or more sensors 608. As shown in FIG. 2, the connected device 200 may be running a cybersecurity application 250.

Figure 7:
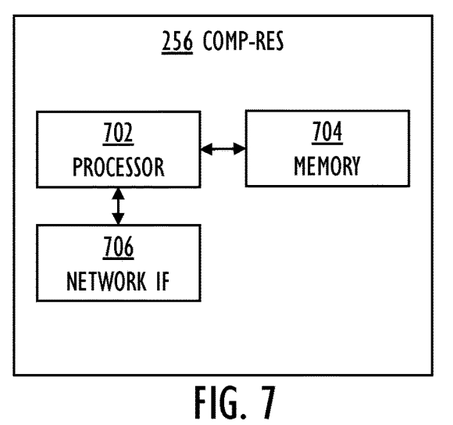
FIG. 7 is a block diagram illustrating an example of a computing resource.

FIG. 7 illustrates an example of a computing resource 256 such as a server apparatus. The server apparatus 256 may be a networked computer server, which interoperates with the CPE 230 according to a client-server architecture, a cloud computing architecture, a peer-to-peer system, or another applicable distributed computing architecture. As shown in FIG. 7, the server apparatus 256 comprises one or more memories 704, and one or more processors 702 coupled to the one or more memories 704 configured to carry out the method/algorithm. In addition, the server apparatus 256 comprises a network interface (such as an Ethernet network interface card) 706 configured to couple the server apparatus 256 to the Internet 224. As shown in FIG. 4, the computing resource 256 may be running a cybersecurity application 254, such as a cybersecurity server application 254.

Figure 8A:
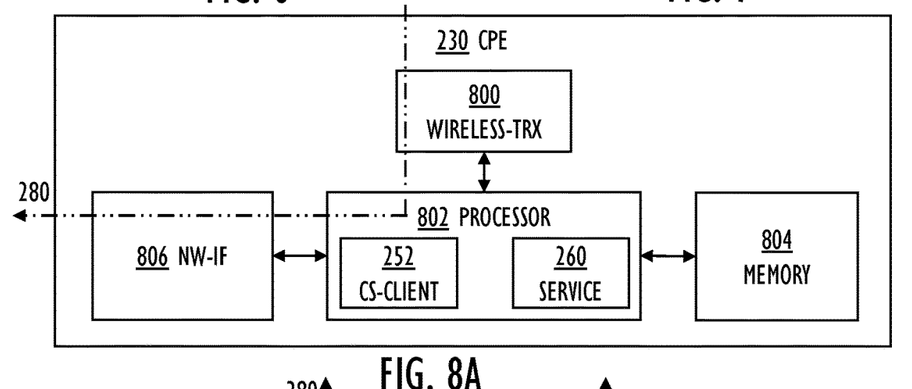
FIG. 8A and FIG. 8B are block diagrams illustrating examples of a customer-premises equipment.
Figure 8B:
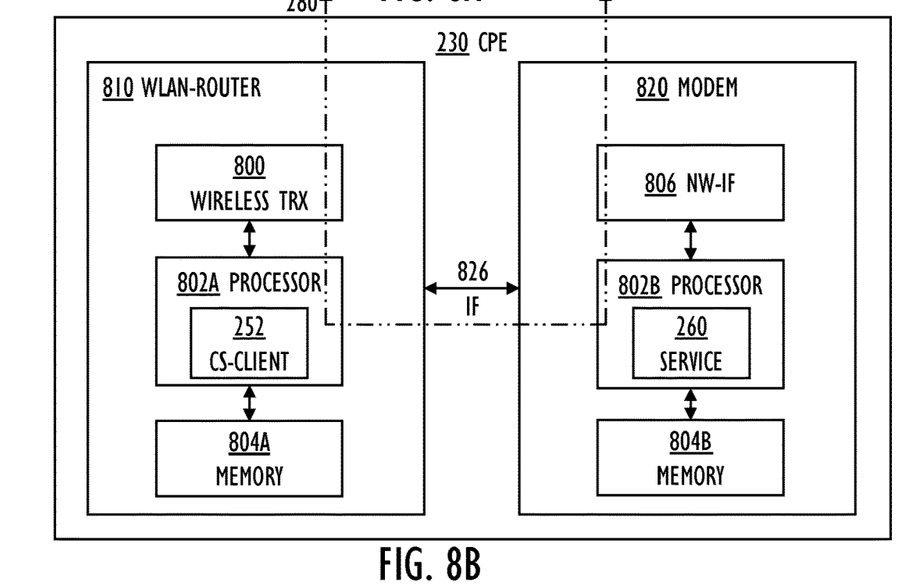

FIG. 8A and FIG. 8B illustrate examples of a customer-premises equipment 230.

In FIG. 8A, the CPE 230 is an integrated apparatus comprising one or more memories 804, and one or more processors 802 coupled to the one or more memories 804 configured to carry out the method/algorithm. Additionally, the CPE 230 comprises a wireless radio transceiver 800 configured to create the WLAN 222 for enabling access by the connected device 200. The CPE 230 also comprises a network interface 806 to act as a modem configured to connect to the telecommunication circuit of the carrier at the demarcation point, i.e., to the WAN 224. The network interface 806 may operate as a Digital Subscriber Line (DSL) modem using different variants such as Very high bitrate DSL (VDSL), Symmetric DSL (SDSL), or Asymmetric DSL (ADSL). The network interface 806 may also operate using alternative wired or even wireless access technologies including, but not being limited to: the Data Over Cable Service Interface Specification (DOCSIS), the Gigabit-capable Passive Optical Network (GPON), the Multimedia over Coax Alliance (MoCA®), the Multimedia Terminal Adapter (MTA), and the fourth generation (4G), fifth generation (5G), or even a higher generation cellular radio network access technology. As shown in FIG. 4, the CPE 230 may be running a cybersecurity client 252. The CPE 230 is configured to implement the platform for the service 260. As shown in FIG. 8A, the platform may be provided by the one or more memories 804, and the one or more processors 802.

In FIG. 8B, the CPE 230 is a two-part apparatus. A WLAN router part 810 comprises the one or more memories 804A, the one or more processors 802A coupled to the one or more memories 804A configured to carry out the method/algorithm, and the wireless transceiver 800 to create the WLAN 222 for enabling access by the connected device 200. A modem part 820 comprises the one or more processors 802B coupled to one or more memories 804B configured to carry out modem operations, and the network interface 806 to act as the modem configured to connect to the WAN 224. The WLAN router part 810 may be purchased by the user 210 of the connected device 200 to gain access to the method/algorithm, whereas the modem part 820 may be provided by a carrier providing the telecommunication circuit access. As shown in FIG. 8B, the WLAN router part 810 and the modem part 820 may be communicatively coupled by an interface 826 (such as a wired Ethernet interface). As shown in FIG. 8B, the platform may be provided by the one or more memories 804A, and the one or more processors 802A, but also additionally, or alternatively, by the one or more memories 804B, and the one or more processors 802B.

In an example, replacing 114 the active MAC address of the connected device 200 with an earlier MAC address of the connected device 200 may be implemented so that setting the earlier MAC address of the connected device 200 is set 126 in an Ethernet frame of the data packet for a transmission in the CPE 230. The WLAN signal (such as Wi-Fi®) may be organized into IEEE 802.11 frames at the data link layer. These 802.11 frames are similar to IEEE 802.3 Ethernet frames but with extra address fields. The wireless transceiver 800 receives and transmits over the WLAN 222, and the network interface 806 receives and transmits over the WAN 224.

Instead of the cybersecurity client 252 illustrated in FIG. 8A and FIG. 8B, another component running on the CPE 230 may be configured to run an algorithm implementing the method of FIG. 1A, FIG. 1B, and FIG. 1C.

The CPE 230 may be implemented using proprietary software or using at least partly open software development kits. In an example, the Reference Design Kit for Broadband (RDK-B) may be used, but the implementation is not limited to that as it may be implemented in other applicable environments as well. At the time of writing of this patent application, more information regarding the RDK may be found in wiki.rdkcentral.com. Another alternative implementation environment is Open Wireless Router (OpenWrt®), which is an open-source project for embedded operating systems of the CPE 230 based also on Linux. At the time of writing of this patent application, more information regarding the OpenWrt® may be found in openwrt.org. In general, the CPE 230 may be configured to implement the platform for the service in the middleware (such as the RDK-B or the OpenWrt®) of the CPE 230, and, in addition, the communication mechanisms enabling the access of data packets by the services 260 may be configured to operate in the middleware of the CPE 230.

Note that the cybersecurity apparatus 500 of FIG. 5A and FIG. 5B may use the described MAC processing internally. If needed, the active MAC address and/or the one or more earlier MAC addresses may be passed between two or more of the cybersecurity client 252, the cybersecurity server 254, and the cybersecurity application 250.

As illustrated in FIG. 2, the functionality of the MAC processing entity 262 including the capability to carry out the method/algorithm, may be implemented in a centralized fashion by a stand-alone single physical unit 230, or alternatively in a distributed fashion using more than one communicatively coupled physical units 230, 256.

These physical units comprise the CPE 230 running the cybersecurity client 252, and the computing resource 256 running the cybersecurity server 254. The method/algorithm operations may be implemented by one or more of these apparatuses 230/256 executing the cybersecurity software 252/254.

As can be understood by the person skilled in the art, the method/algorithm operations may be distributed among the distributed software comprising the cybersecurity client 252, and the cybersecurity server 254 in different configurations. In an example, the cybersecurity client 252 communicates 274 with the cybersecurity server 254 to implement the method/algorithm functionality.

Thus, the cybersecurity client 252 may comprise a stand-alone fashion to carry out the method/algorithm, or a part of the functionality augmented by the functionality of the cybersecurity server 254. The cybersecurity client 252 may operate as a frontend with a relatively limited resources as regards to the processor and memory, whereas the cybersecurity server 254 may operate as a backend with a relatively unlimited resources as regards to the processor and memory, and the capability to serve a very large number of the connected devices 200 simultaneously.

Even though the invention has been described with reference to one or more examples according to the accompanying drawings, it is clear that the invention is not restricted thereto but can be modified in several ways within the scope of the appended claims. All words and expressions should be interpreted broadly, and they are intended to illustrate, not to restrict, the examples. As technology advances, the inventive concept defined by the claims can be implemented in various ways.

What is claimed is:

1. A computer-implemented method comprising:
after a data packet containing an active medium access control (MAC) address of a connected device enters a customer-premises equipment (CPE), replacing the active MAC address contained in the data packet with an earlier MAC address of the connected device that was previously stored by the CPE;
providing, by the CPE, the data packet to a service executing in the CPE for processing; and
subsequent to providing the data packet to the service and before the data packet exits the CPE, replacing the earlier MAC address contained in the data packet with the active MAC address.

2. The method of claim 1, wherein replacing the active MAC address with the earlier MAC address of the connected device further comprises:
seizing the data packet containing the active MAC address;
obtaining the active MAC address from the data packet;
retrieving the earlier MAC address of the connected device from a mapping between the active MAC address and the earlier MAC address;
replacing the active MAC address with the earlier MAC address in the data packet; and
releasing the data packet containing the earlier MAC address for a transmission in the CPE.

3. The method of claim 1, wherein replacing the earlier MAC address with the active MAC address further comprises:
seizing the data packet containing the earlier MAC address;
obtaining the earlier MAC address from the data packet;
retrieving the active MAC address from a mapping between the active MAC address and the earlier MAC address;
replacing the earlier MAC address with the active MAC address in the data packet; and
releasing the data packet containing the active MAC address for a transmission exiting the CPE.

4. The method of claim 1, wherein the CPE is configured to implement a local area network (LAN) for a data communication of the connected device, and an access for the data communication to a wide area network (WAN).

5. The method of claim 1, wherein the CPE is configured to implement a platform for services, and at least one service is configured to register the connected device with the earlier MAC address.

6. The method of claim 1, wherein the active MAC address comprises a randomized MAC address of the connected device.

7. The method of claim 6, wherein the randomized MAC address is different from the earlier MAC address used for an initial registration to at least one service in the CPE.

8. The method of claim 1, wherein the earlier MAC address comprises one of a vendor-embedded MAC address, or a randomized MAC address used for an initial registration to at least one service in the CPE.

9. The method of claim 1, wherein internal routing tables of the CPE are configured to operate using the earlier MAC address.

10. The method of claim 1, wherein replacing the active MAC address with the earlier MAC address of the connected device further comprises:
setting the earlier MAC address of the connected device in an Ethernet frame of the data packet for a transmission in the CPE.

11. The method of claim 1, wherein the data packet originates from the connected device, and the active MAC address is in a source MAC address of the data packet.

12. The method of claim 11, wherein replacing the earlier MAC address with the active MAC address further comprises:
in response to bridging the data packet, setting the active MAC address in the source MAC address of the data packet; or
in response to routing the data packet, setting a MAC address of the CPE in the source MAC address of the data packet.

13. The method of claim 12, wherein the MAC address of the CPE comprises a MAC address of a wide area network (WAN) interface of the CPE.

14. The method of claim 1, wherein a response data packet is addressed to the connected device in response to the data packet.

15. The method of claim 14, further comprising:
after the response data packet containing a MAC address of a wide area network (WAN) interface of the CPE enters the CPE from a WAN, replacing the MAC address of the WAN interface of the CPE with the earlier MAC address in a destination MAC address of the response data packet; and
before the response data packet with the earlier MAC address exits the CPE to a local area network (LAN), replacing the earlier MAC address with the active MAC address in the destination MAC address of the response data packet.

16. The method of claim 1, further comprising:
prior to receiving the data packet containing the active MAC address, receiving, by the CPE, a previous data packet originating from the connected device, the previous data packet containing the earlier MAC address;
extracting, by the CPE, the earlier MAC address from the previous data packet; and
storing, by the CPE, the earlier MAC address in a data structure.

17. A customer-premises equipment (CPE) comprising:
one or more memories; and
one or more processor devices coupled to the one or more memories configured to:
after a data packet containing an active medium access control (MAC) address of a connected device enters the CPE, replace the active MAC address contained in the data packet with an earlier MAC address of the connected device that was previously stored by the CPE;
provide the data packet to a service executing in the CPE for processing; and
subsequent to providing the data packet to the service and before the data packet exits the CPE, replace the earlier MAC address contained in the data packet with the active MAC address.

18. The CPE of claim 17, wherein the active MAC address comprises a randomized MAC address of the connected device, and wherein the randomized MAC address is different from the earlier MAC address used for an initial registration to at least one service in the CPE.

19. The CPE of claim 17, wherein the earlier MAC address comprises one of a vendor-embedded MAC address, or a randomized MAC address used for an initial registration to at least one service in the CPE.

20. A non-transitory computer-readable medium comprising a computer program with instructions which, when executed by a customer-premises equipment (CPE), cause the CPE to:
after a data packet containing an active medium access control (MAC) address of a connected device enters the CPE, replace the active MAC address contained in the data packet with an earlier MAC address of the connected device that was previously stored by the CPE;
provide, by the CPE, the data packet to a service executing in the CPE for processing; and
subsequent to providing the data packet to the service and before the data packet exits the CPE, replace the earlier MAC address contained in the data packet with the active MAC address.

* * * * *